United States Patent [19]
Yamaguchi et al.

[11] Patent Number: 6,026,359
[45] Date of Patent: Feb. 15, 2000

[54] SCHEME FOR MODEL ADAPTATION IN PATTERN RECOGNITION BASED ON TAYLOR EXPANSION

[75] Inventors: Yoshikazu Yamaguchi, Kanagawa-ken; Shigeki Sagayama, Tokyo; Jun-ichi Takahashi; Satoshi Takahashi, both of Kanagawa-ken, all of Japan

[73] Assignee: Nippon Telegraph and Telephone Corporation, Japan

[21] Appl. No.: 08/929,879

[22] Filed: Sep. 15, 1997

[30] Foreign Application Priority Data

Sep. 20, 1996 [JP] Japan .................................... 8-250540

[51] Int. Cl.$^7$ .................................................. G10L 5/06
[52] U.S. Cl. ........................................ 704/256; 704/255
[58] Field of Search ................................. 704/225, 231, 704/233, 255, 256

[56] References Cited

U.S. PATENT DOCUMENTS

| | | | |
|---|---|---|---|
| 5,271,088 | 12/1993 | Bahler | 395/2 |
| 5,465,317 | 11/1995 | Epstein | 395/2.45 |
| 5,487,133 | 1/1996 | Park et al. | 395/27 |
| 5,537,647 | 7/1996 | Hermansky et al. | 395/2.2 |
| 5,566,270 | 10/1996 | Albesano et al. | 395/2.41 |
| 5,627,939 | 5/1997 | Huang et al. | 395/2.65 |
| 5,715,367 | 2/1998 | Gillick et al. | 395/2.63 |
| 5,721,808 | 2/1998 | Minami et al. | 395/2.65 |
| 5,791,904 | 8/1998 | Russell et al. | 434/185 |
| 5,799,276 | 8/1998 | Komissarchik et al. | 704/251 |

OTHER PUBLICATIONS

Martin, F., et al. "Recognition of Noisy Speech by using the Composition of Hidden Markov Models." pp. 65–66.

Gales, M.J.F., and Young, S. (1992) "An Improved Approach To The Hidden Markov Model Decomposition Of Speech And Noise." pp. I–233–I–236 Cambridge University.

Boll, Steven. (1979) "Suppression of Acoustic Noise in Speech Using Spectral Subtraction," pp. 113–120 *IEEE Transactions on Acoustics, Speech, and Signal, Processing* vol. ASSP–27, No. 2.

Flaherty et al, "Orthogonal transformations of Stacked Feature Vectors applied to HMM Speech Recognition", IEE 1993, vol. 140, #2, Apr., 19.

Cheng et al, "Improved Model Parameter Compensation Methods for Noise Robust Speech Recognition", IEEE, pp. 561–564, 1998.

Kim, "Statistical Linear Approximation for Environment Compensation", IEEE Signal Processing Letters, vol. 5 #1, pp. 8–10, Jan., 1999.

Hwang et al, "Feature Adaptation Using Deviation Vector for robust speech Recognition in Noisy Environment", 1997 IEEE, pp. 1227–1230.

Moreno et al, "A Vector Taylor Series approach for Environment Independent Speech Recognition", 1995 IEEE, pp. 733–736.

*Primary Examiner*—David R. Hudspeth
*Assistant Examiner*—Michael N. Opsasnick
*Attorney, Agent, or Firm*—Jones & Askew

[57] ABSTRACT

A model adaptation scheme in the pattern recognition, which is capable of realizing a fast, real time model adaptation and improving the recognition performance. This model adaptation scheme determines a change in a parameter expressing a condition of pattern recognition and probabilistic model training between an initial condition at a time of acquiring training data used in obtaining a model parameter of each probabilistic model and a current condition at a time of actual recognition. Then, the probabilistic models are adapted by obtaining a model parameter after a condition change by updating a model parameter before a condition change according to the determined change, when the initial condition and the current condition are mismatching. The adaptation processing uses a Taylor expansion expressing a change in the model parameter in terms of a change in the parameter expressing the condition.

16 Claims, 7 Drawing Sheets

SCHEME FOR MODEL ADAPTATION IN PATTERN RECOGNITION BASED ON TAYLOR EXPANSION

BACKGROUND OF THE INVENTION

1. Field of the Invention

The present invention relates to the pattern recognition that uses the Hidden Markov Model for expressing recognition targets such as speech, character, figure, etc., and more particularly, to a scheme for model adaptation which is aimed at correcting a mismatch of a model due to a difference between a condition at a time of model creation and a condition at a time of model use in form of recognition execution, and thereby improving the recognition performance.

Note that the present invention is generally applicable to various pattern recognition using the Hidden Markov Model (HMM), but the following description will be given for an exemplary case of speech recognition for the sake of clarity.

2. Description of the Background Art

In the speech recognition, the input speech data is matched with the acoustic model (phoneme model, syllable model, word model, etc.) obtained from training speech data and the likelihood is determined so as to obtain the recognition result. Here, a parameter of the model largely depend on conditions (background noise, channel distortion, speaker, vocal tract length, etc.) under which the training speech data are recorded. Consequently, when the speech recording condition is different from the condition at a time of actual recognition, there arises a mismatch between the input speech pattern and the model which in turn causes a lowering of the recognition rate.

Such a lowering of the recognition rate due to a mismatch between the input speech data and the acoustic model can be prevented by re-creating the model by using the speech data recorded under the same condition as that at a time of actual recognition. However, the model based on the statistical method such as HMM requires an enormous amount of training speech data so that the processing requires a considerable time (such as 100 hours, for example). For this reason, there is a need for the adaptation technique that can adapt a mismatching model to a model that completely matches with the condition at a time of actual recognition, by using less amount of training data and less processing time.

As an example of condition change, there is a change of the background noise at a time of utterance. The recognition rate is lowered when the background noise at a time of model training speech data recording is different from the background noise at a time of actual recognition.

The conventionally known techniques for adaptation of the model with respect to the background noise include the HMM composition schemes such as PMC (see M. J. F. Gales et al.: "An Improved Approach to the Hidden Markov Model Decomposition of Speech and Noise", Proc. of ICASSP92, pp. 233–236, 1992, for example) and NOVO (see F. Martin et al.: "Recognition of Noisy Speech by using the Composition of Hidden Markov Models", Proc. of Acoustic Society of Japan Autumn 1992, pp. 65–66, for example). The HMM composition scheme is an adaptation technique in which the HMM trained by using clean speeches without noise that were recorded in a soundproof room (which will be referred to as a clean speech HMM hereafter) is combined with the HMM trained by using only background noises at a time of recognition (which will be referred to as a noise HMM hereafter), so as to obtain the HMM that can match with the input speech by having the background noises at a time of recognition superposed therein. The use of the HMM composition scheme only requires the training of the noise HMM and the processing time for the model composition, so that it is possible to adapt the model by a relatively less time compared with a case of re-creating the model by using an enormous amount of speech data.

However, the conventional speech recognition has been associated with the problem that it is difficult to adapt the model in real time according to continuously changing condition, because a rather long noise recording time (15 seconds, for example) is required for the purpose of obtaining the training data for the noise HMM and a rather long processing time (about 10 seconds) is required as the processing time for the model composition.

SUMMARY OF THE INVENTION

It is therefore an object of the present invention to provide a scheme for model adaptation in the pattern recognition, which is capable of realizing a fast, real time model adaptation and improving the recognition performance, by using data that express the condition observed after a condition change, while using an initial model as a reference model, so as to adapt the initial model before the condition change to a model that matches with the environmental condition after the condition change.

According to one aspect of the present invention there is provided a method of model adaptation in a pattern recognition in which a likelihood of an input vector with respect to each probabilistic model expressing features of each recognition category is calculated and a recognition category expressed by a probabilistic model with a highest likelihood among a plurality of prescribed probabilistic models is outputted as a recognition result, the method comprising the steps of: determining a change in a parameter expressing a condition of pattern recognition and probabilistic model training, between an initial condition at a time of acquiring training data used in obtaining a model parameter of each probabilistic model and a current condition at a time of actual recognition; and adapting the probabilistic models by obtaining a model parameter after a condition change by updating a model parameter before a condition change according to the change determined by the determining step, when the initial condition and the current condition are mismatching.

According to another aspect of the present invention there is provided a computer based apparatus for model adaptation in a pattern recognition in which a likelihood of an input vector with respect to each probabilistic model expressing features of each recognition category is calculated and a recognition category expressed by a probabilistic model with a highest likelihood among a plurality of prescribed probabilistic models is outputted as a recognition result, the apparatus comprising: a change determination unit for determining a change in a parameter expressing a condition of pattern recognition and probabilistic model training, between an initial condition at a time of acquiring training data used in obtaining a model parameter of each probabilistic model and a current condition at a time of actual recognition; and an adaptation unit for adapting the probabilistic models by obtaining a model parameter after a condition change by updating a model parameter before a condition change according to the change determined by the change determination unit, when the initial condition and the current condition are mismatching.

According to another aspect of the present invention there is provided an article of manufacture, comprising: a computer usable medium having computer readable program code means embodied therein for causing a computer to function as a model adaptation system in a pattern recognition in which a likelihood of an input vector with respect to each probabilistic model expressing features of each recognition category is calculated and a recognition category expressed by a probabilistic model with a highest likelihood among a plurality of prescribed probabilistic models is outputted as a recognition result, the computer readable program code means including: first computer readable program code means for causing said computer to determine a change in a parameter expressing a condition of pattern recognition and probabilistic model training, between an initial condition at a time of acquiring training data used in obtaining a model parameter of each probabilistic model and a current condition at a time of actual recognition; and second computer readable program code means for causing said computer to adapt the probabilistic models by obtaining a model parameter after a condition change by updating a model parameter before a condition change according to the change determined by the first computer readable program code means, when the initial condition and the current condition are mismatching.

According to another aspect of the present invention there is provided a pattern recognition apparatus, comprising: an input unit for inputting input vectors; a parameter extraction unit for extracting a parameter expressing a condition of pattern recognition and probabilistic model training from each input vector; an initial condition probabilistic model creation and storage unit for creating and storing an initial condition probabilistic model from the parameter expressing the condition extracted from the input vector inputted under an initial condition at a time of acquiring training data; a reference probabilistic model storage unit for storing prescribed reference probabilistic models corresponding to a prescribed value of the parameter expressing the condition; an initial condition imposed probabilistic model creation and storage unit for creating and storing initial condition imposed probabilistic models from the initial condition probabilistic model and the reference probabilistic models; a Jacobian matrix calculation and storage unit for calculating and storing Jacobian matrices of a Taylor expansion expressing a change in a model parameter in terms of a change in the parameter expressing the condition, from the initial condition probabilistic model and the initial condition imposed probabilistic models; a difference calculation unit for calculating a difference between the initial condition probabilistic model and an adaptation target condition probabilistic model obtained from the parameter expressing the condition which is extracted from the input vector inputted under a current condition at a time of actual recognition; an adapted condition imposed probabilistic model calculation and storage unit for calculating and storing adapted condition imposed probabilistic models from the difference, the initial condition imposed probabilistic models, and the Jacobian matrices; and a pattern recognition unit for carrying out a pattern recognition by calculating a likelihood of each adapted condition imposed probabilistic model expressing features of each recognition category and outputting a recognition category with respect to the input vector expressed by an adapted condition imposed probabilistic model with a highest likelihood among the adapted condition imposed probabilistic models as a recognition result.

According to another aspect of the present invention there is provided a speech recognition apparatus, comprising: a speech input unit for inputting input noisy speech data; a noise extraction unit for extracting a noise data from each input noisy speech data; a noise spectral subtraction unit for obtaining over-estimation and under-estimation error components of the noise data by calculating an average spectrum from a partial or entire section of the noise data and subtracting the average spectrum from a spectrum of an entire section of the noise data; an initial noise model creation and storage unit for creating and storing an initial noise model from the over-estimation and under-estimation error components of the noise data which is obtained from the input noisy speech data inputted under an initial condition at a time of acquiring training data; a clean speech model storage unit for storing prescribed clean speech models; an initial noisy speech model creation and storage unit for creating and storing initial noisy speech models from the initial noise model and the clean speech models; a Jacobian matrix calculation and storage unit for calculating and storing Jacobian matrices of a Taylor expansion expressing a change in a model parameter in terms of a change in the noise data, from the initial noise model and the initial noisy speech models; a difference calculation unit for calculating a difference between the initial noise model and an adaptation target noise model obtained from the over-estimation and under-estimation error components of the noise data which is obtained from the input noisy speech data inputted under a current condition at a time of actual recognition; an adapted noisy speech model calculation and storage unit for calculating and storing adapted noisy speech models from the difference, the initial noisy speech models, and the Jacobian matrices; a noisy speech spectral subtraction unit for obtaining a noise subtracted speech data by calculating an average spectrum from a partial or entire section of the noise data which is obtained from the input noisy speech data inputted under a current condition at a time of actual recognition, and subtracting the average spectrum from a spectrum of an entire section of the input noisy speech data inputted under a current condition at a time of actual recognition; and a speech recognition unit for carrying out a speech recognition by calculating a likelihood of each adapted noisy speech model expressing features of each recognition category with respect to the noise subtracted speech data and outputting a recognition category expressed by an adapted noisy speech model with a highest likelihood among the adapted noisy speech models as a recognition result.

According to another aspect of the present invention there is provided a pattern recognition method, comprising the steps of: inputting input vectors; extracting a parameter expressing a condition of pattern recognition and probabilistic model training from each input vector; creating and storing an initial condition probabilistic model from the parameter expressing the condition extracted from the input vector inputted under an initial condition at a time of acquiring training data; storing prescribed reference probabilistic models corresponding to a prescribed value of the parameter expressing the condition; creating and storing initial condition imposed probabilistic models from the initial condition probabilistic model and the reference probabilistic models; calculating and storing Jacobian matrices of a Taylor expansion expressing a change in a model parameter in terms of a change in the parameter expressing the condition, from the initial condition probabilistic model and the initial condition imposed probabilistic models; calculating a difference between the initial condition probabilistic model and an adaptation target condition probabilistic model obtained from the parameter expressing the condition which is extracted from the input vector inputted under a current condition at a time of actual recognition; calculating and storing adapted condition imposed probabilistic models from the difference, the initial condition imposed probabilistic models, and the Jacobian matrices; and carrying out a pattern recognition by calculating a likelihood of each adapted condition imposed probabilistic model expressing features of each recognition category with respect to the input vector and outputting a recognition category expressed by an adapted condition imposed probabilistic model with a highest likelihood among the adapted condition imposed probabilistic models as a recognition result.

According to another aspect of the present invention there is provided a speech recognition method, comprising the steps of: inputting input noisy speech data; extracting a noise data from each input noisy speech data; obtaining over-estimation and under-estimation error components of the noise data by calculating an average spectrum from a partial or entire section of the noise data and subtracting the average spectrum from a spectrum of an entire section of the noise data; creating and storing an initial noise model from the over-estimation and under-estimation error components of the noise data which is obtained from the input noisy speech data inputted under an initial condition at a time of acquiring training data; storing prescribed clean speech models; creating and storing initial noisy speech models from the initial noise model and the clean speech models; calculating and storing Jacobian matrices of a Taylor expansion expressing a change in a model parameter in terms of a change in the noise data, from the initial noise model and the initial noisy speech models; calculating a difference between the initial noise model and an adaptation target noise model obtained from the over-estimation and under-estimation error components of the noise data which is obtained from the input noisy speech data inputted under a current condition at a time of actual recognition; calculating and storing adapted noisy speech models from the difference, the initial noisy speech models, and the Jacobian matrices; obtaining a noise subtracted speech data by calculating an average spectrum from a partial or entire section of the noise data which is obtained from the input noisy speech data inputted under a current condition at a time of actual recognition, and subtracting the average spectrum from a spectrum of an entire section of the input noisy speech data inputted under a current condition at a time of actual recognition; and carrying out a speech recognition by calculating a likelihood of each adapted noisy speech model expressing features of each recognition category with respect to the noise subtracted speech data and outputting a recognition category expressed by an adapted noisy speech model with a highest likelihood among the adapted noisy speech models as a recognition result.

According to another aspect of the present invention there is provided a method of model adaptation in a pattern recognition in which a likelihood of an input vector with respect to each probabilistic model expressing features of each recognition category is calculated and a recognition category expressed by a probabilistic model with a highest likelihood among a plurality of prescribed probabilistic models is outputted as a recognition result, the method comprising the steps of: (a) training an initial condition probabilistic model from a parameter expressing a condition of pattern recognition and probabilistic model training which is recorded at a time of model training; (b) obtaining an initial condition imposed probabilistic models from the initial condition probabilistic model and prescribed reference probabilistic models corresponding to a prescribed value of the parameter expressing the condition; (c) calculating and storing Jacobian matrices of a Taylor expansion expressing a change in a model parameter in terms of a change in the parameter expressing the condition, from the initial condition probabilistic model and the initial condition imposed probabilistic models; (d) training an adaptation target condition probabilistic model by using the parameter expressing the condition which is observed at a time of actual recognition; and (e) obtaining an adapted condition imposed probabilistic models by updating the initial condition imposed probabilistic models according to the Taylor expansion using the Jacobian matrices, when the initial condition probabilistic model and the adaptation target condition probabilistic model are mismatching.

According to another aspect of the present invention there is provided a computer based apparatus for model adaptation in a pattern recognition in which a likelihood of an input vector with respect to each probabilistic model expressing features of each recognition category is calculated and a recognition category expressed by a probabilistic model with a highest likelihood among a plurality of prescribed probabilistic models is outputted as a recognition result, the apparatus comprising: (a) a unit for training an initial condition probabilistic model from a parameter expressing a condition of pattern recognition and probabilistic model training which is recorded at a time of model training; (b) a unit for obtaining an initial condition imposed probabilistic models from the initial condition probabilistic model and prescribed reference probabilistic models corresponding to a prescribed value of the parameter expressing the condition; (c) a unit for calculating and storing Jacobian matrices of a Taylor expansion expressing a change in a model parameter in terms of a change in the parameter expressing the condition, from the initial condition probabilistic model and the initial condition imposed probabilistic models; (d) a unit for training an adaptation target condition probabilistic model by using the parameter expressing the condition which is observed at a time of actual recognition; and (e) a unit for obtaining an adapted condition imposed probabilistic models by updating the initial condition imposed probabilistic models according to the Taylor expansion using the Jacobian matrices, when the initial condition probabilistic model and the adaptation target condition probabilistic model are mismatching.

According to another aspect of the present invention there is provided an article of manufacture, comprising: a computer usable medium having computer readable program code means embodied therein for causing a computer to function as a model adaptation system in a pattern recognition in which a likelihood of an input vector with respect to each probabilistic model expressing features of each recognition category is calculated and a recognition category expressed by a probabilistic model with a highest likelihood among a plurality of prescribed probabilistic models is outputted as a recognition result, the computer readable program code means including: first a computer readable program code means for causing said computer to train an initial condition probabilistic model from a parameter expressing a condition of pattern recognition and probabilistic model training which is recorded at a time of model training; second computer readable program code means for causing said computer to obtain an initial condition imposed probabilistic models from the initial condition probabilistic model and prescribed reference probabilistic models corresponding to a prescribed value of the parameter expressing the condition; third computer readable program code means for causing said computer to calculate and store Jacobian matrices of a Taylor expansion expressing a change in a model parameter in terms of a change in the parameter expressing the condition, from the initial condition probabilistic model and the initial condition imposed probabilistic models; fourth computer readable program code means for causing said computer to train an adaptation target condition probabilistic model by using the parameter expressing the condition which is observed at a time of actual recognition; and fifth computer readable program code means for causing said computer to obtain an adapted condition imposed probabilistic models by updating the initial condition imposed probabilistic models according to the Taylor expansion using the Jacobian matrices, when the initial condition probabilistic model and the adaptation target condition probabilistic model are mismatching.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 8, various embodiments of a scheme for model adaptation in the pattern recognition according to the present invention will be described.

The model adaptation scheme of the present invention is generally applicable to a type of pattern recognition processing in which a likelihood of an input vector with respect to each probabilistic model expressing features of each recognition category is calculated and a category expressed by a model with the highest likelihood is outputted as a recognition result. The model adaptation scheme of the present invention prevents the lowering of the recognition rate in such a pattern recognition in a case where a condition (such as background noises, for example) at a time of actual recognition is different from the initial condition at a time of initial model training. In short, this is achieved in the model adaptation model of the present invention by calculating a change of the model parameter from a change (difference) between these two conditions in approximation using the Taylor expansion, updating a parameter of a reference model accordingly, creating a model that matches with the condition at a time of actual recognition accordingly, and carrying out the recognition by using this matching model.

Figure 1:
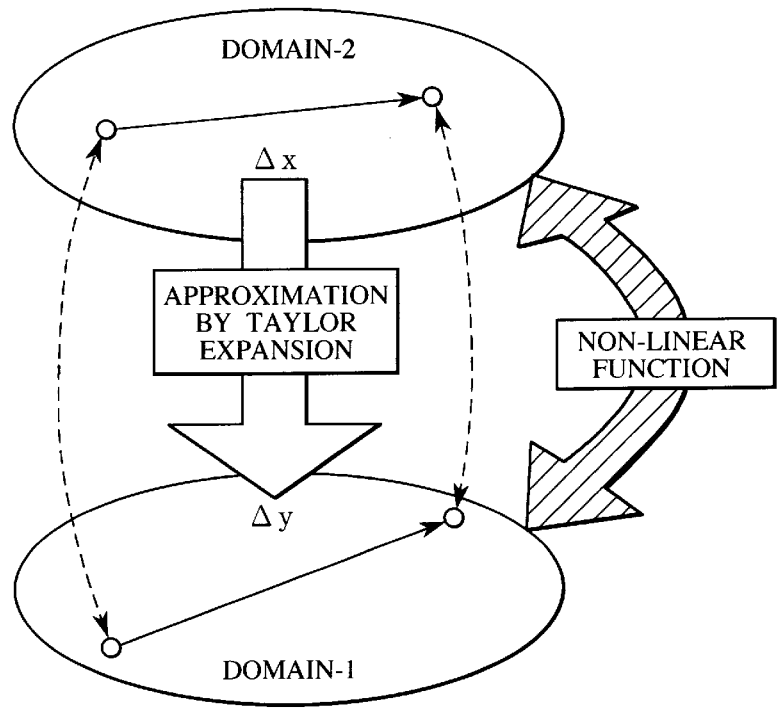
FIG. 1 is a diagram for explaining an approximation by the Taylor expansion between small changes of vectors contained in two domains in a non-linear relationship, which is utilized in the model adaptation scheme of the present invention

First, with references to FIG. 1 and FIG. 2, the basic principle of the present invention will be described.

Consider vectors x and y which are contained in two domains in a non-linear relationship.

$$y=f(x) \quad (1)$$

In other words, y is expressed by a linear or non-linear function f(x) of x. Now, consider a change in y corresponding to a small change in x.

$$y+\Delta y=f(x+\Delta x) \quad (2)$$

By applying the Taylor expansion in x to the function f(x), the following relationship holds.

$$f(x + \Delta x) = f(x) + \frac{f'(x)}{1!}\Delta x + \frac{f''(x)}{2!}(\Delta x)^2 + \ldots + \frac{f^{(n-1)}(x)}{(n-1)!}(\Delta x)^{n-1} + \frac{f^{(n)}(x + \theta \Delta x)}{n!}(\Delta x)^n \quad (3)$$

$$(0 < \theta < 1)$$

Consequently, by taking only up to the first order differential term in the above Taylor expansion (3), the following relationship holds between the small changes $\Delta x$ and $\Delta y$ of these vectors. This relationship is also illustrated in FIG. 1.

$$\Delta y = \frac{dy}{dx}\Delta x \quad (4)$$

By using the relationship (4), $\Delta y$ can be obtained in approximation by a multiplication of $\Delta x$ and the Jacobian matrix, without requiring a transformation of x into y.

Now, it is necessary to update a model parameter for expressing a recognition target according to a condition change. For this reason, a procedure for obtaining a change in the model parameter from a change in a parameter expressing the condition will be considered. Here, suppose that $\Delta y$ is a change in the model parameter and $\Delta x$ is a change in the parameter expressing the condition. According to the above relationship (4), a change $\Delta y$ in the model parameter can be obtained in approximation by a small amount of calculation at high speed, by simply observing a change $\Delta x$ in the parameter expressing the condition, without requiring a complicated calculation for a non-linear mapping from x to y, regardless of whether a change in the parameter expressing the condition and a change in the model parameter are in a linear relationship or in a non-linear relationship.

Note that a change in the vector is assumed to be very small here so that it suffices to take only up to the first order differential term of the above Taylor expansion (3), but it is also possible to use the second and higher order differential terms if desired.

Now, considering a case of changing background noise in the speech recognition as an example of a condition change, the noise adaptation for correcting a mismatching of the model caused by a change between the background noise at a time of initial model training and the background noise at a time of actual recognition will be described.

First, a procedure for obtaining the Jacobian matrix will be described for an exemplary case of using the cepstrum as a parameter. The acoustic model often uses the cepstrum as its feature parameter.

The power spectrum $S_R$ (expressed as a vector) of the speech to which the background noise is superposed (which will be referred to as the noisy speech hereafter) can be expressed as a sum of a clean speech power spectrum $S_S$ and a background noise power spectrum $S_N$.

$$S_R = S_S + S_N \tag{5}$$

Figure 2:
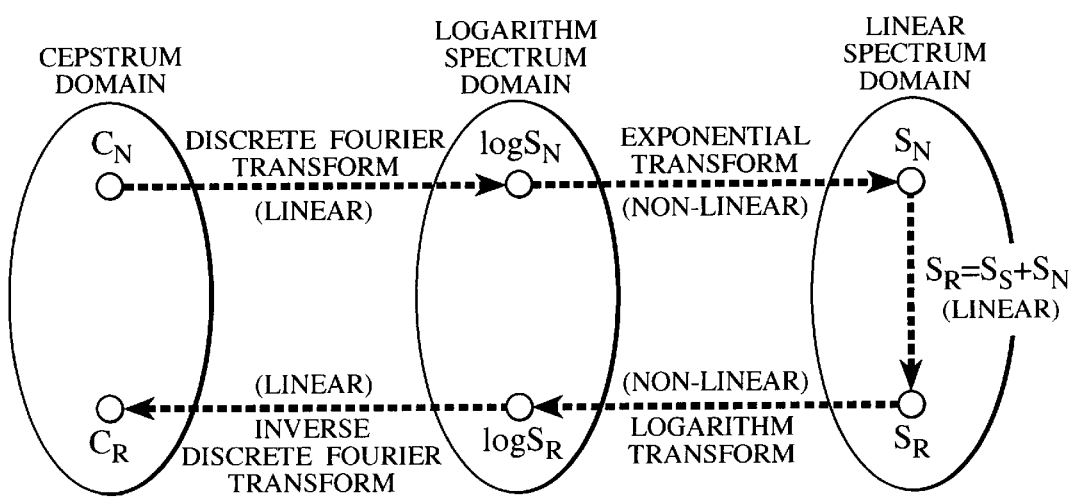
FIG. 2 is a diagram for explaining a non-linear transformation process from a noise cepstrum to a noisy speech cepstrum according to the model adaptation scheme of the present invention.

When this relationship is transformed into the cepstrum domain, a noisy speech cepstrum $C_R$, a clean speech cepstrum $C_S$ and a noise cepstrum $C_N$ have the following relationship, which is illustrated in FIG. 2.

$$C_R = IDFT(\log(\exp(DFT(C_S)) + \exp(DFT(C_N)))) \tag{6}$$

where $DFT(\cdot)$, $IDFT(\cdot)$, $\log(\cdot)$ and $\exp(\cdot)$ denote the discrete Fourier transform, the inverse discrete Fourier transform, a logarithm transform and an exponential transform, respectively. The discrete Fourier transform is a linear transformation, but the logarithm transform and the exponential transform are non-linear transformations, so that the noisy speech cepstrum $C_R$ and the noise cepstrum $C_N$ has a non-linear relationship.

When the background noise at a time of recording the initial model training speech data is different from the background noise at a time of actual recognition, if the noisy speech cepstrum is to be obtained by using the above relationship (6) from the noise cepstrum of the background noise observed at a time of actual recognition, it would be necessary to carry out many complicated calculations such as the discrete Fourier transform twice, the logarithm transform once and the exponential transform once.

On the other hand, when the Taylor expansion is used, a change $\Delta C_R$ in the noisy speech cepstrum can be obtained from a change $\Delta C_N$ in the noise cepstrum and the Jacobian matrix, so that there is no need to transform a change $\Delta C_N$ in the noise cepstrum by using the complicated relationship (6) described above.

$$\Delta C_R = \frac{\partial C_R}{\partial C_N} \Delta C_N \tag{7}$$

Next, a method for calculating the Jacobian matrix $J_N = \partial C_R / \partial C_N$ in the above equation (7) will be described. The Jacobian matrix can be expanded as follows.

$$J_N = \frac{\partial C_R}{\partial (\log S_R)} \frac{\partial (\log S_R)}{\partial S_R} \frac{\partial S_R}{\partial S_N} \frac{\partial S_N}{\partial (\log S_N)} \frac{\partial (\log S_N)}{\partial C_N} \tag{8}$$

Then, the partial differential terms contained in the above equation (8) can be calculated by using the relationships among domains as indicated in FIG. 2, as follows.

$$C_R = IDFT(\log S_R) = F^{-1}(\log S_R), \quad \left(\frac{\partial C_R}{\partial (\log S_R)}\right)_{ij} = F_{ij}^{-1}$$

$$(\log S_R) = \log(S_R), \quad \left(\frac{\partial (\log S_R)}{\partial S_R}\right)_{ij} = \delta_{ij}^{-1} \frac{1}{S_{Ri}}$$

$$S_R = S_S + S_N, \quad \left(\frac{\partial S_R}{\partial S_N}\right)_{ij} = \delta_{ij}$$

$$S_N = \exp(\log S_N), \quad \left(\frac{\partial S_N}{\partial (\log S_N)}\right)_{ij} = \delta_{ij} S_{Ni}$$

$$(\log S_N) = DFT(C_N) = FC_N, \quad \left(\frac{\partial (\log S_N)}{\partial C_N}\right)_{ij} = F_{ij}$$

$$\delta_{ij} = \begin{cases} 1 & \text{if } i = j \\ 0 & \text{otherwise} \end{cases}$$

$$0 \leq i, j < p$$

where F is the cosine transform matrix, while $F^{-1}$ is the inverse cosine transform matrix, and p is the degree (including the power terms) of the cepstrum which is also the degree of the spectrum.

Then, the elements of the Jacobian matrix can be expressed as follows.

$$[J_N]_{ij} = \sum_k \frac{S_{Nk}}{S_{Rk}} F_{ik}^{-1} F_{kj} \qquad 0 \leq i, j, k < p \tag{9}$$

where $[J_N]_{ij}$, $F_{ij}$ and $F_{ij}^{-1}$ are i-th row j-th column elements of the matrices $J_N$, F and $F^{-1}$ respectively, $S_{Nk}$ and $S_{Rk}$ are k-th elements of the vectors $S_N$ and $S_R$ respectively.

In other words, each element of the Jacobian matrix can be obtained from the noise spectrum $S_N$, the noisy speech spectrum $S_R$, and the transform matrices F and $F^{-1}$ which are constants. The noise spectrum $S_N$ and the noisy speech spectrum $S_R$ can be obtained by transforming the noise cepstrum $C_N$ and the noisy speech cepstrum $C_R$ into the linear spectra, respectively. Consequently, the Jacobian matrix can be calculated in advance when the background noise at a time of model training is recorded.

Next, a procedure for updating the initial noisy speech HMMs before the background noise change into the noisy speech HMMs that match with the background noise after the background noise change (at a time of actual recognition) (which will be referred to as an adapted noisy speech HMMs hereafter) by using the above described Taylor expansion will be described.

Here, the adaptation of a cepstrum mean vector of an output probability distribution that exists in each state of the HMM will be considered. According to the above equation (7), a mean vector $C_R'$ of the adapted noisy speech HMMs can be calculated as follows.

$$C_R' = C_R + J_N(C_N' - C_N) \tag{10}$$

where $C_R$ is a mean vector of the initial noisy speech HMMs, $C_N$ is a mean vector of an output probability distribution of the HMM that is obtained from the background noise data before the noise change (which will be referred to as an initial noise HMM hereafter), and $C_N'$ is a mean vector of an output probability distribution of the HMM that is obtained from the background noise after the noise change (at a time of actual recognition) (which will be referred to as an adaptation target noise HMM hereafter).

Here, $C_R$ can be given by a mean vector of the noisy speech HMMs that are trained by the speech data to which the background noise before the noise change is superposed. It is also possible to use the noisy speech HMMs that are obtained by the HMM composition from the initial noise HMM and the clean speech HMMs without any background noise instead.

In order to obtain the Jacobian matrix $J_N$ in the above equation (10), it is necessary to have $C_N$ and $C_R$ as already mentioned above in relation to the method for calculating the Jacobian matrix. These $C_N$ and $C_R$ are parameters before the background noise change, so that they can be calculated in advance, as a preparation for the noise change.

According to the above equation (10), when $C_N$, $C_R$, $J_N$ and $C_N'$ are determined, the noisy speech cepstrum $C_R'$ that matches with the condition at a time of actual recognition can be obtained immediately.

The model adaptation scheme of the present invention as described above can be divided into a preliminary processing that can be carried out in advance before the noise change (a time of actual recognition), and an adaptation processing that can be carried out when the Namely, the processing for obtaining the initial noise HMM, the initial noisy speech HMMs, and the Jacobian matrices can be realized as the preliminary processing. Consequently, at a time of actual recognition, the adaptation of the acoustic model can be completed by a small amount of calculations for obtaining the adaptation target noise HMM and carrying out the matrix calculation of the above equation (10).

Figure 3:
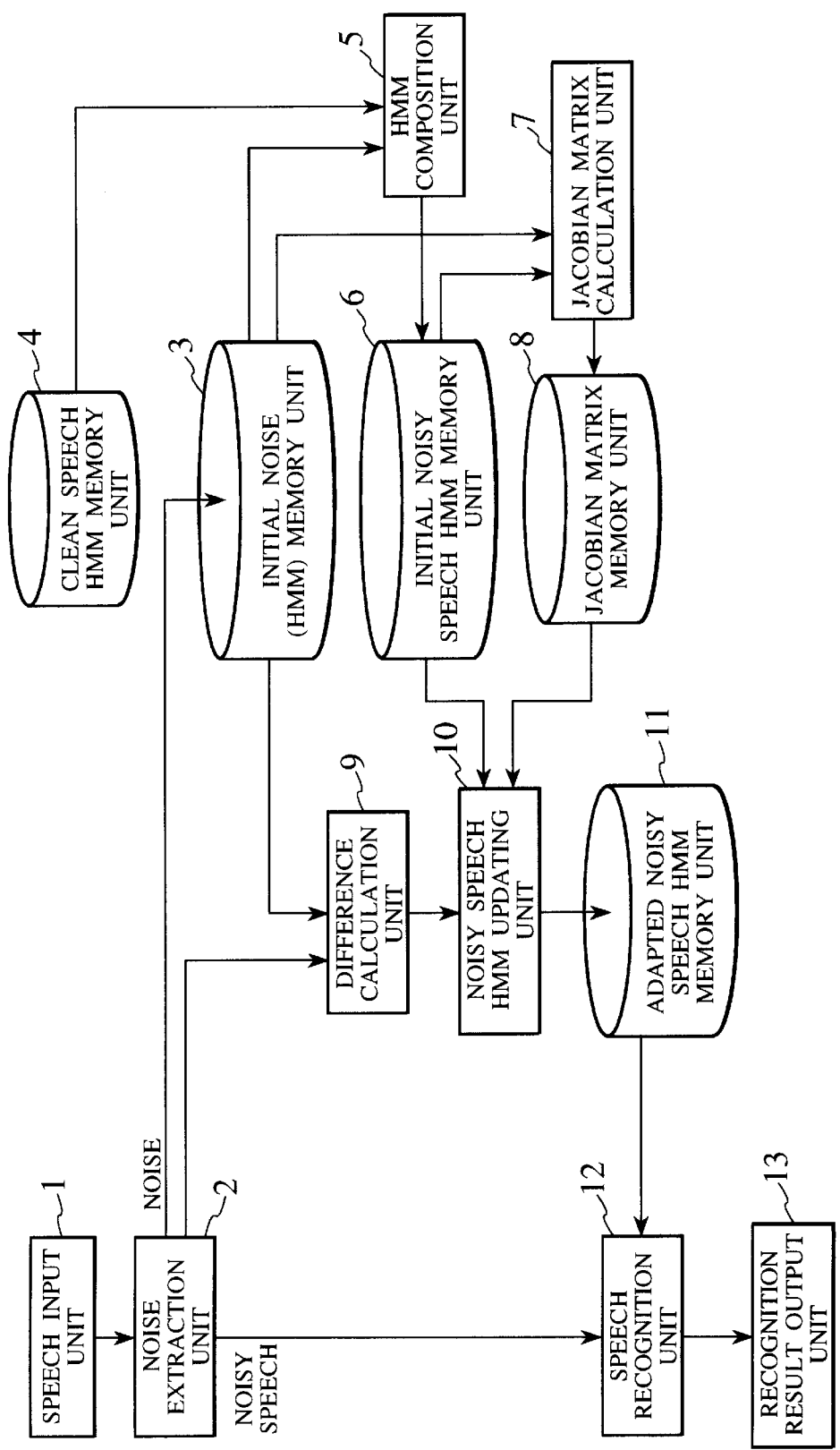
FIG. 3 is a block diagram of a model adaptation apparatus according to the first embodiment of the present invention.
Figure 4:
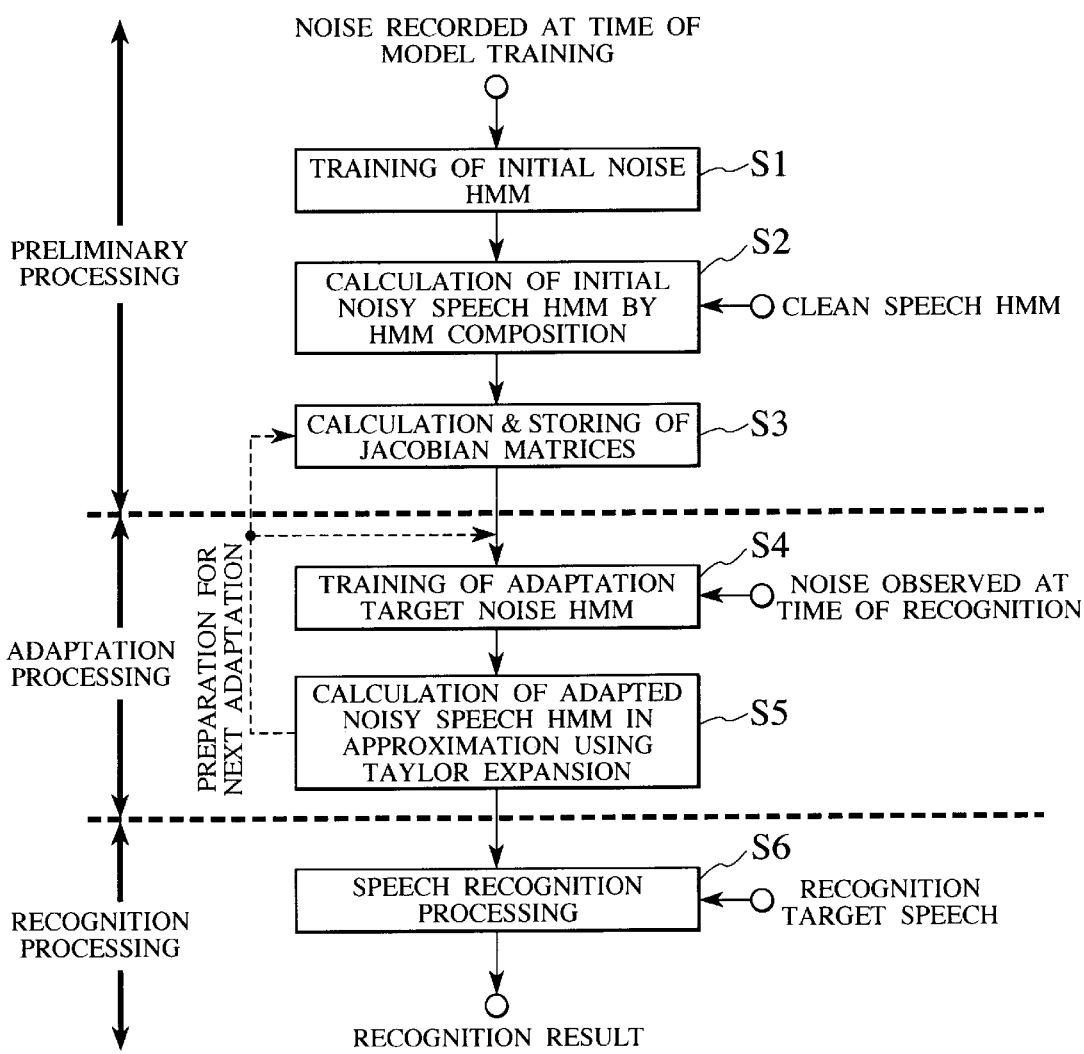
FIG. 4 is a flow chart for the operation of the model adaptation apparatus of FIG. 3.

Referring now to FIG. 3 and FIG. 4, the first embodiment of the model adaptation scheme according to the present invention will be described in detail.

FIG. 3 shows a configuration of a model adaptation apparatus in this first embodiment, while FIG. 4 shows a flow chart for the operation of this model adaptation apparatus of FIG. 3.

In the model adaptation apparatus of FIG. 3, first at a time of model training, the initial noise HMM is obtained from the background noise that is entered at a speech input unit 1 and extracted at a noise extraction unit 2 (step S1), and stored in an initial noise (HMM) memory unit 3. Also, the initial noise HMM is composed with the clean speech HMMs stored in a clean speech HMM memory unit 4 by the HMM composition at an HMM composition unit 5 so as to calculate the initial noisy speech HMMs (step S2), and the calculated initial noisy speech HMMs are stored in an initial noisy speech HMM memory unit 6. Then, the Jacobian matrices are calculated from the initial noise HMM and the initial noisy speech HMMs at a Jacobian matrix calculation unit 7, and stored in a Jacobian matrix memory unit 8 (step S3).

Next, at a time of actual recognition, a noise data is extracted at the noise extraction unit 2 from an input noisy speech (a recognition target speech) entered at the speech input unit 1 as the adaptation target noise HMM, and when there is a mismatch between the input noisy speech and the initial noisy speech HMMs, a difference between the adaptation target noise HMM and the initial noise HMM is obtained at a difference calculation unit 9 (step S4). Then, a processing for updating the initial noisy speech HMMs based on the Taylor expansion using the obtained difference and the Jacobian matrices is carried out by a noisy speech HMM updating unit 10 so as to calculate the adapted noisy speech HMMs in approximation (step S5), and the obtained adapted noisy speech HMMs are stored in an adapted noisy speech HMM memory unit 11. Then, the recognition processing of the input noisy speech is carried out at a speech recognition unit 12 by using the adapted noisy speech HMMs (step S6), and an obtained recognition result is outputted at a recognition result output unit 13.

Note that, in the operation of FIG. 4, the preliminary processing of the steps S1, S2 and S3, that is, the calculation and storing of the initial noise HMM, the initial noisy speech HMMs and the Jacobian matrices, is to be carried out only once initially, even when the background noise is changing at every occasion of the recognition, and the calculated values are to be stored in the respective memory units for subsequent use. Then, at a time of actual recognition, the subsequent adaptation processing and recognition processing of the steps S4, S5 and S6 that utilize these stored information alone are repeatedly executed.

Alternatively, it is also possible to carry out the processing of the steps S3 to S6 at every occasion of the recognition by using the adaptation target noise HMM and the adapted noisy speech HMMs obtained from the immediately previous utterance as a new initial model.

Figure 5:
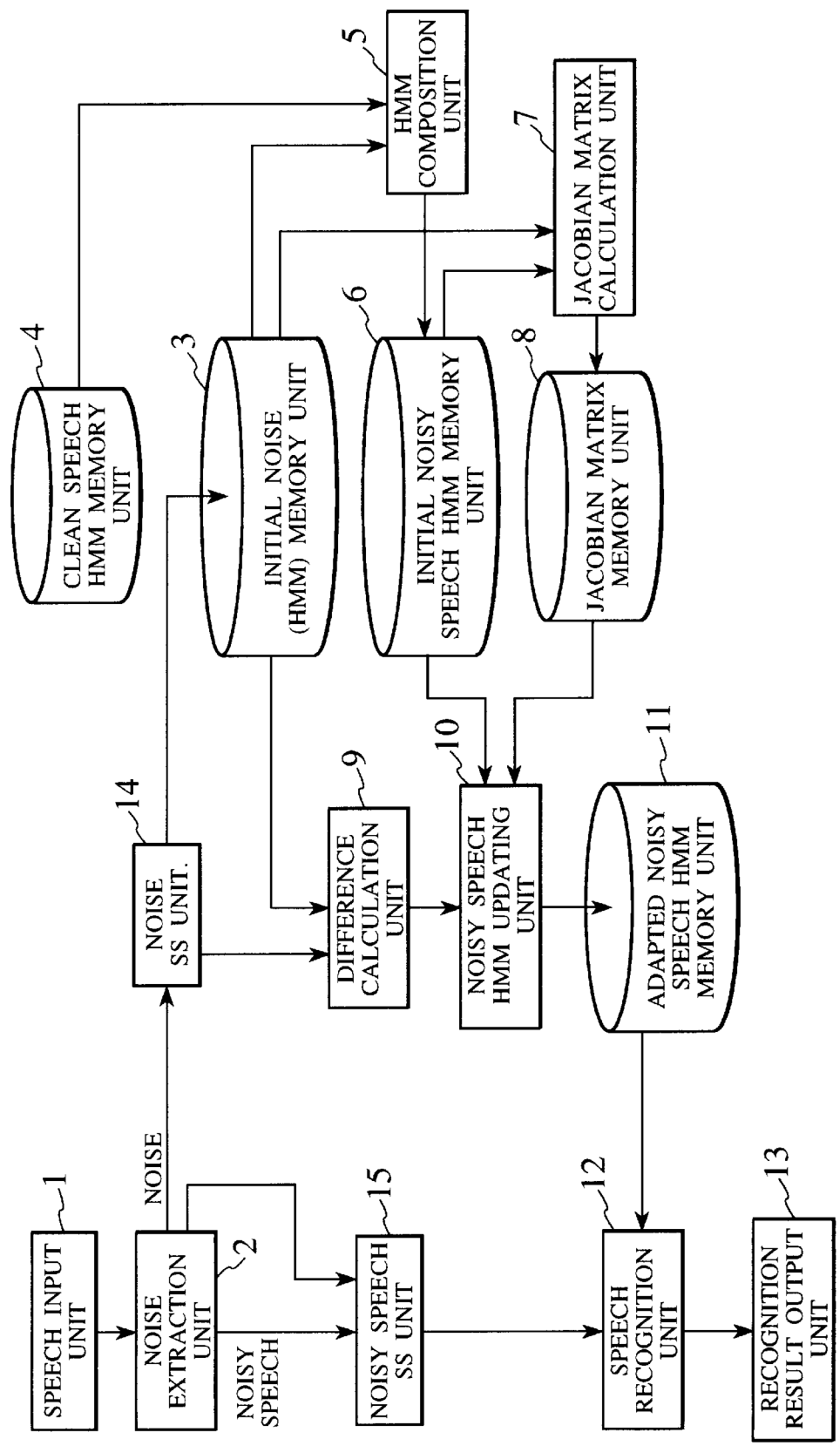
FIG. 5 is a block diagram of a model adaptation apparatus according to the second embodiment of the present invention.
Figure 6:
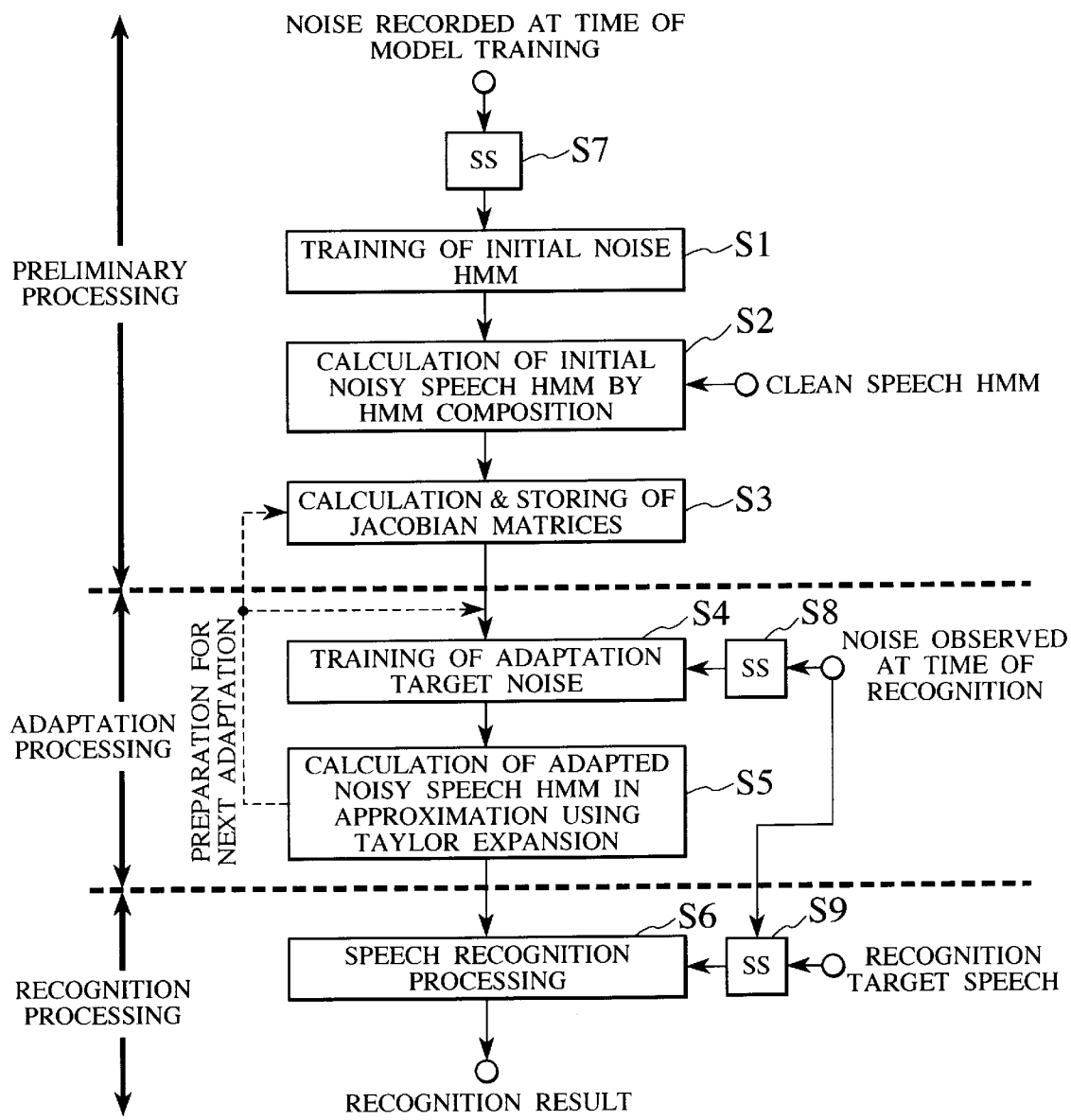
FIG. 6 is a flow chart for the operation of the model adaptation apparatus of FIG. 5.

Referring now to FIG. 5 and FIG. 6, the second embodiment of the model adaptation scheme according to the present invention will be described in detail.

This second embodiment is directed to a case of the noise adaptation combined with the spectral subtraction (abbreviated hereafter as SS; see S. F. Boll: "Suppression of Acoustic Noise in Speech Using Spectral Subtraction", IEEE Trans. on ASSP, Vol. ASSP-27, No. 2, pp. 113–120, 1979, for example). Note here that the SS is a noise removal method in which an average spectrum is calculated by using a partial or entire section of the recorded background noise, and the S/N ratio of the input data is improved by subtracting the calculated average spectrum from the input data spectrum. This SS requires a small amount of calculations because it only calls for the spectrum average calculation and the spectrum subtraction.

FIG. 5 shows a configuration of a model adaptation apparatus in this second embodiment, while FIG. 6 shows a flow chart for the operation of this model adaptation apparatus of FIG. 5.

This model adaptation apparatus of FIG. 5 differs from that of FIG. 3 in that a noise SS unit 14 and a noisy speech SS unit 15 are additionally provided at output sides of the noise extraction unit 2 The other elements of this model adaptation apparatus of FIG. 5 are substantially the same as the corresponding elements of FIG. 3 described above.

In this model adaptation apparatus of FIG. 5, in conjunction with the step S1 of the preliminary processing and the step S4 of the adaptation processing, the SS is carried out at the noise SS unit 14 by using a partial or entire section of the recorded background noise (the background noise recorded at a time of model training and the background noise at a time of actual recognition) by calculating the average spectrum and subtracting this average spectrum from the spectrum of the entire section of the recorded noise data, so as to obtain the over-estimation and under-estimation error components of the noise (steps S7 and S8). Then, the initial noise HMM and the adaptation target noise HMM are created by using the obtained over-estimation and under-estimation error components of the noise as training data at the steps S1 and S4 respectively.

In addition, the SS is also carried out at the noisy speech SS unit 15 in conjunction with the step S6 of the recognition processing (step S9), so that the speech recognition unit 12 carries out the recognition of the speech data obtained by the subtraction of the obtained over-estimation and under-estimation error components of the noise from the input noisy speech.

The other steps of this operation of FIG. 6 are substantially the same as the corresponding steps of FIG. 4 described above.

Next, the third embodiment of the model adaptation scheme according to the present invention will be described in detail.

This third embodiment is directed to a case of the noise adaptation using a plurality of Jacobian matrices obtained from a plurality of initial noises.

In the present invention, the recognition rate resulting from the adaptation to the adaptation target noise depends on a choice of the initial noise. For example, consider a case of the adaptation in which the adaptation target noise is an air-conditioner noise. In this case, the air-conditioner noise is a relatively stable noise, so that the effect of the adaptation according to the present invention can be enhanced by choosing a stable noise such as a noise that is mostly dominated by the sound of a fan of a computer as the initial noise, rather than choosing a non-stable noise such as a noise that contains the sounds of running cars and human voices at a street corner.

However, the adaptation target noise is not necessarily known in advance so that it is difficult to prepare the best initial noise that can take the full advantage of the present invention. For this reason, in this third embodiment, a plurality of initial noises of different types are prepared, and the best initial noise among these plurality of noises is selected at a time of the noise adaptation so as to constantly realize the noise adaptation with a high recognition rate regardless of a type of the adaptation target noise.

In this third embodiment, the model adaptation apparatus has a configuration similar to that of FIG. 3 described above, except that the initial noise (HMM) memory unit 3 stores a plurality of initial noise HMMs for a plurality of initial noises and the initial noisy speech HMM memory unit 6 stores a plurality of sets of initial noisy speech HMMs corresponding to a plurality of initial noises while the Jacobian matrix memory unit 8 stores a plurality of sets of Jacobian matrices corresponding to a plurality of initial noises, and the noisy speech HMM updating unit 10 has a function for selecting the best initial noise.

The selection of the best initial noise can be realized as follows.

First, a plurality of initial noises of different types are prepared, and the initial noise HMM and the Jacobian matrix corresponding to each initial noise are calculated and stored in advance.

Then, the similarity of the adaptation target noise observed at a time of actual recognition and each stored initial noise is calculated. Here, the calculation of the similarity can be realized, for example, by using the Euclidean distance between a mean vector of an output probability distribution of the initial noise HMM and a mean vector of an output probability distribution of the adaptation target noise HMM. More specifically, the Euclidean distance D(i) between a mean vector of an output probability distribution of the initial noise HMM and a mean vector of an output probability distribution of the adaptation target noise HMM can be calculated as follows.

$$D(i) = \left( \sum_{k=0}^{p} (C'_{Nk} - C^i_{Nk})^2 \right)^{1/2} \quad (11)$$

where $C^i_{Nk}$ is the k-th element of the mean vector $C^i_N$ of n output probability distribution of the i-th initial noise HMM, and $C'_{Nk}$ is the k-th element of the mean vector $C'_N$ of an output probability distribution of the adaptation target noise HMM.

By using the above equation (11), the Euclidean distances of the adaptation target noise HMM with respect to all the initial noise HMMs are calculated, and the initial noise HMM $i_{min}$ for which the calculated Euclidean distance is the smallest is selected as follows.

$$i_{min} = \mathrm{argmin}_{i} D(i) \quad (12)$$

Then, the update of the noisy speech HMMs according to the present invention as described above is carried out by using the initial noise HMM selected in this manner and the corresponding Jacobian matrices, and then the recognition using the adapted noisy speech HMMs is carried out as described above. In this manner, by preparing a plurality of initial noise HMMs and a plurality of Jacobian matrices, selecting one initial noise HMM that resembles the observed adaptation target noise HMM most, and carrying out the parameter updating according to the present invention by using the selected initial noise HMM and the corresponding Jacobian matrices, it becomes possible to constantly realize the noise adaptation with a high recognition rate.

In the above embodiments, the model adaptation according to the present invention for a case of dealing with a change of background noise has been described, but the model adaptation scheme of the present invention is equally applicable to various other cases.

For instance, it is possible to apply the model adaptation according to the present invention to a case of dealing with a change of channel distortion. In this case, a parameter for expressing the channel distortion is the same cepstrum that also serves as the model parameter. Consequently, the differential coefficient in the Taylor expansion of the above equation (7) becomes 1 so that the calculation can be carried out very simply.

It is also possible to apply the model adaptation according to the present invention to a case of dealing with a change of vocal tract length. In this case, the model parameter can be adapted according to a change of the vocal tract length parameter according to the present invention as described above.

Next, the results of experiments on the acoustic model adaptation in a case of dealing with a change of background noise that were conducted by the present inventors for the purpose of demonstrating the effect of the present invention will be described. Here, the experiments were conducted under the assumption that the background noise in the initial state was the street corner noise but the background noise at a time of actual recognition is changed to the exhibition hall noise. In the result described below, the model adaptation scheme according to the present invention is also referred to as the Jacobian adaptation for short.

Figure 7:
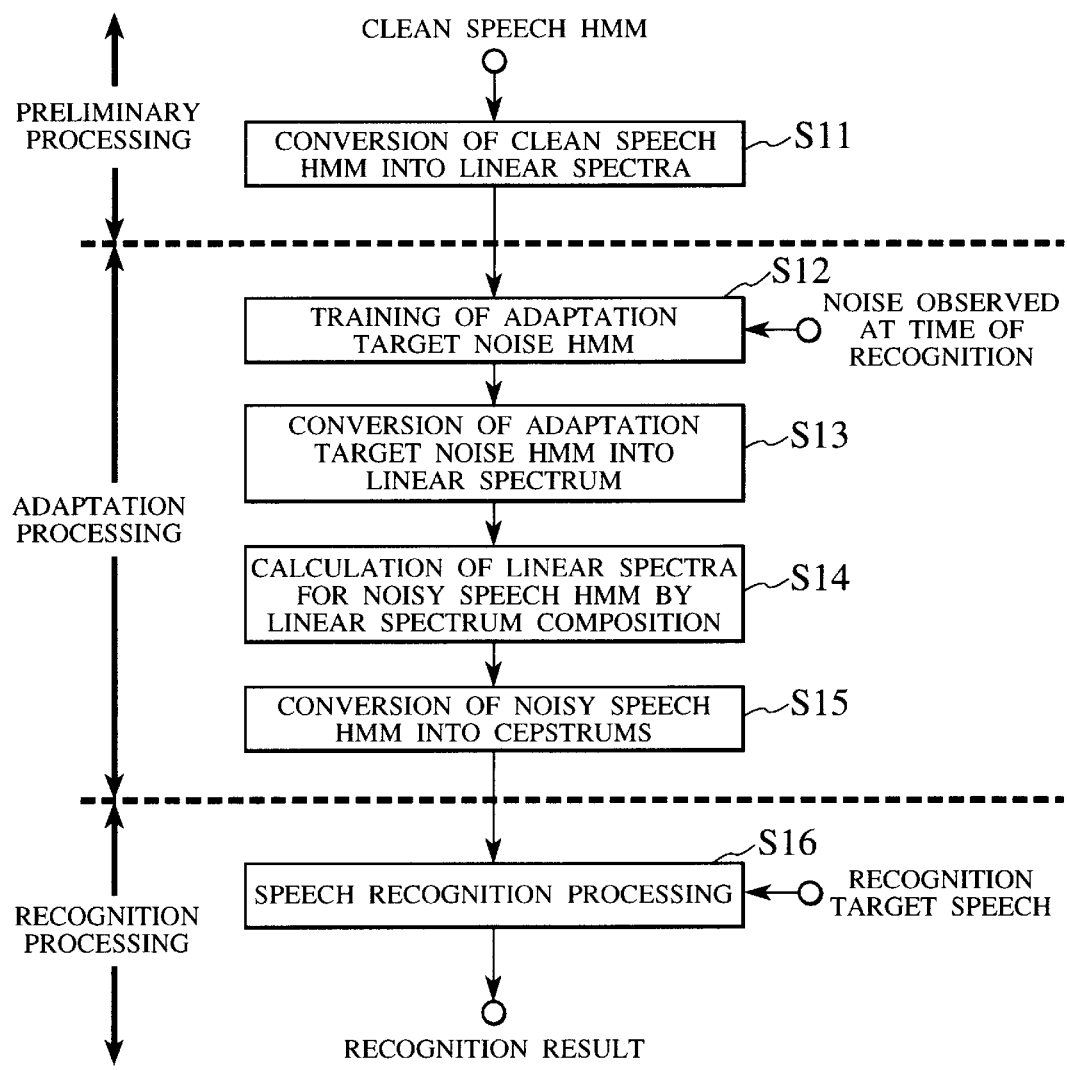
FIG. 7 is a flow chart for the processing procedure according to the conventional model adaptation scheme called NOVO.

For the purpose of comparison, an experiment on the model adaptation according to the representative conventional noise adaptation scheme NOVO was also conducted. Here, the processing procedure of the NOVO is as shown in FIG. 7, which comprises: the conversion of the clean speech HMMs into linear spectra using clean speech HMM inputs (step S11); the training of the adaptation target noise HMM using a noise observed at a time of actual recognition (step S12); the conversion of the adaptation target noise HMM into a linear spectrum (step S13); the calculation of linear spectra for the noisy speech HMMs by the linear spectrum composition (step S14); the conversion of the noisy speech HMMs into cepstrums (step S15); and the speech recognition processing using a recognition target speech (step S16).

In addition, an experiment for a case of no adaptation in which the initial noisy speech model obtained by the NOVO from the background noise in the initial state (the street corner noise) is directly used for the speech recognition after the noise change was also conducted. Furthermore, an experiment for a case in which the models obtained from the clean HMMs are directly used for the speech recognition was also conducted.

In these experiments, the evaluation data were names of 100 cities uttered by 13 different speakers, to which the exhibition hall noise is superposed by the computer processing. The adaptation was carried out by training the adaptation target noise HMM by using the exhibition hall noise data in a section immediately before the evaluation data. The S/N ratio with respect to the evaluation data was 10 dB for both the street corner noise and the exhibition hall noise. The recognition vocabulary contained 400 words.

Figure 8:
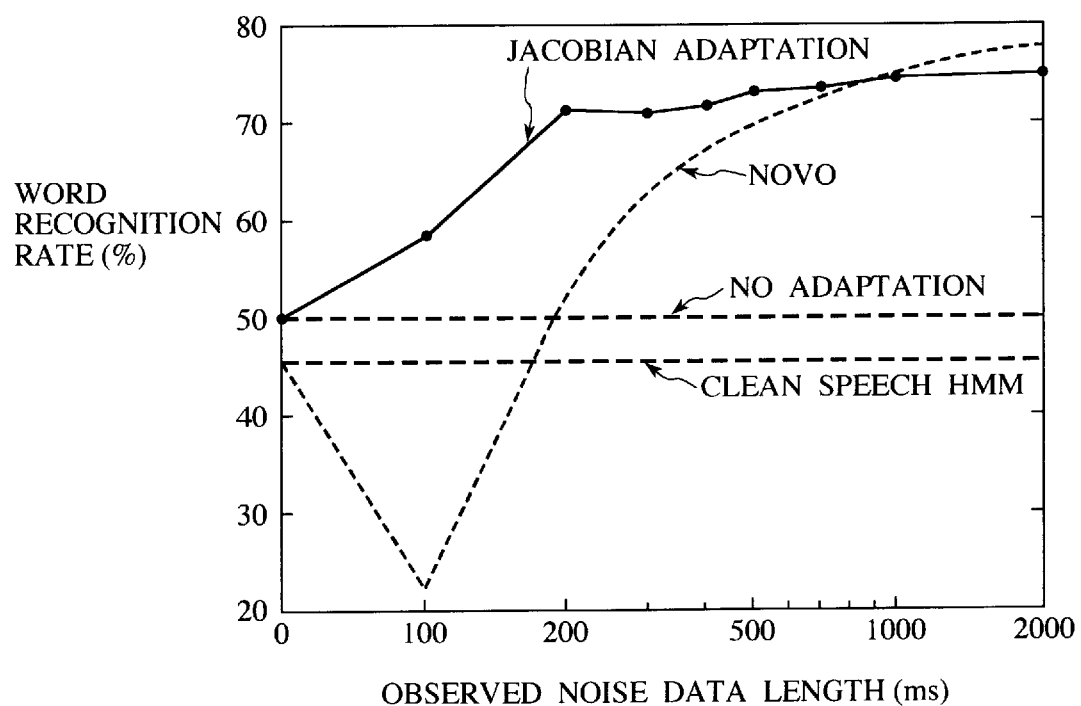
FIG. 8 is a graph showing word recognition rate results obtained by experiments on the acoustic model adaptation using the model adaptation scheme of the present invention and the conventional schemes.

FIG. 8 shows the word recognition rate results obtained by the model adaptation scheme of the present invention and the three other conventional schemes described above with respect to various exhibition hall noise data lengths (that is, various noise observation times) used for the adaptation. Also, the table 1 below shows a comparison of the processing amounts (CPU time) required for the adaptation processing in the model adaptation scheme of the present invention and the NOVO. Note here that the amount of calculations required for the acoustic processing and the noise training in the adaptation processing depends on the adapted noise data length so that the CPU time required for them is not included in the CPU time shown in the table 1 for both the model adaptation scheme of the present invention and the NOVO.

TABLE 1

|  | Jacobian Adaptation | NOVO | Jacobian/NOVO |
| --- | --- | --- | --- |
| Preliminary Processing | 2,216 ms | 4,416 ms | ½ |
| Adaptation Processing | 149 ms | 5,066 ms | 1/34 |

(measured by Sun SPARCstation20)

As can be seen from FIG. 8, the NOVO shows the high performance when the adaptation data is sufficiently long (900 ms or longer in FIG. 8), but its performance was drastically lowered when the adaptation data is not sufficiently long. On the other hand, in the model adaptation according to the present invention, the higher performance than the NOVO was obtained for short adaptation data (800 ms or shorter in FIG. 8). Also, as can be seen from the table 1, the processing time required for the adaptation by the present invention was only 1/34 of that required by the NOVO.

Thus it was confirmed that the model adaptation scheme of the present invention is capable of realizing the adaptation by using shorter adaptation data and its adaptation processing is much faster. This feature implies that the model adaptation scheme of the present invention is suitable for the real time adaptation of the acoustic model to the changing background noise.

Next, the result of the experiment on the speech recognition in a case of introducing the SS into the model adaptation scheme of the present invention as in the second embodiment described above will be described. Here, the conditions of the experiment are the same as those described above. The noise data length used in calculating the average spectrum of the noise was 160 ms.

Table 2 shows the word recognition rate results obtained by the model adaptation scheme of the present invention without using the SS (Jacobian adaptation) and the model adaptation scheme of the present invention using the SS (SS-Jacobian adaptation) in a case of using the exhibition hall noise data length of 50 ms for the adaptation.

TABLE 2

| Jacobian Adaptation | SS-Jacobian Adaptation |
| --- | --- |
| 73.2% | 79.6% |

As can be seen from the table 2, it was possible to improve the word recognition rate by introducing the SS into the model adaptation scheme of the present invention. Thus it was confirmed that it is possible to improve the performance of the model adaptation by introducing the SS that only requires a small amount of calculations into the present invention, without sacrificing the fast nature of its adaptation processing.

As described, according to the present invention, the Jacobian matrix is calculated and stored in advance from the initial condition probabilistic model and the initial condition imposed probabilistic model, the adaptation target condition probabilistic model is obtained by measuring the condition at a time of actual recognition, and the adapted condition imposed probabilistic model is calculated in approximation by updating the initial condition imposed probabilistic model using the Taylor expansion based on the Jacobian matrix and a difference between the adaptation target condition probabilistic model and the initial condition probabilistic model, so that it is possible to improve the recognition performance of the pattern recognition by carrying out the adaptation processing by only a small amount of calculations at high speed.

It is to be noted that, in the above embodiments, whether or not there is a mismatch between the input noisy speech and the initial noisy speech HMMs can be judged in various manners. For example, it is possible to judge that there is a mismatch between the input noisy speech and the initial noisy speech HMMs when the noisy speech HMM updating unit judges that a difference between the adaptation target noise HMM and the initial noise HMM as obtained by the difference calculation unit 9 is significant. It is also possible to carry out the speech recognition by using the initial noisy speech HMMs first, and judge whether or not there is a mismatch between the input noisy speech and the initial noisy speech HMMs at the speech recognition unit 12 according to how low the resulting recognition rate is.

It is also to be noted that the above embodiments have been described mainly for a case of the speech input, but the present invention is not limited to this particular case and widely applicable to the other types of pattern recognition such as the recognition of figures, characters, etc.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the preliminary processing and the adaptation processing of the above embodiments as shown in FIG. 4 and FIG. 6 can be conveniently implemented in a form of a software package. It is also possible to implement all of the preliminary processing, the adaptation processing and the recognition processing of the above embodiments in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A pattern recognition apparatus, comprising:

an input unit for inputting input vectors;

a parameter extraction unit for extracting a parameter expressing a condition of pattern recognition and probabilistic model training from each input vector;

an initial condition probabilistic model creation and storage unit for creating and storing an initial condition probabilistic model from the parameter expressing the condition extracted from the input vector inputted under an initial condition at a time of acquiring training data;

a reference probabilistic model storage unit for storing prescribed reference probabilistic models corresponding to a prescribed value of the parameter expressing the condition;

an initial condition imposed probabilistic model creation and storage unit for creating and storing initial condition imposed probabilistic models from the initial condition probabilistic model and the reference probabilistic models;

a Jacobian matrix calculation and storage unit for calculating and storing Jacobian matrices of a Taylor expansion expressing a change in a model parameter in terms of a change in the parameter expressing the condition, from the initial condition probabilistic model and the initial condition imposed probabilistic models;

a difference calculation unit for calculating a difference between the initial condition probabilistic model and an adaptation target condition probabilistic model obtained from the parameter expressing the condition which is extracted from the input vector inputted under a current condition at a time of actual recognition;

an adapted condition imposed probabilistic model calculation and storage unit for calculating and storing adapted condition imposed probabilistic models from the difference, the initial condition imposed probabilistic models, and the Jacobian matrices; and a pattern recognition unit for carrying out a pattern recognition by calculating a likelihood of each adapted condition imposed probabilistic model expressing features of each recognition category with respect to the input vector and outputting a recognition category expressed by an adapted condition imposed probabilistic model with a highest likelihood among the adapted condition imposed probabilistic models as a recognition result.

2. A speech recognition apparatus, comprising:

a speech input unit for inputting input noisy speech data;

a noise extraction unit for extracting a noise data from each input noisy speech data;

a noise spectral subtraction unit for obtaining over-estimation and under-estimation error components of the noise data by calculating an average spectrum from a partial or entire section of the noise data and subtracting the average spectrum from a spectrum of an entire section of the noise data;

an initial noise model creation and storage unit for creating and storing an initial noise model from the over-estimation and under-estimation error components of the noise data which is obtained from the input noisy speech data inputted under an initial condition at a time of acquiring training data;

a clean speech model storage unit for storing prescribed clean speech models;

an initial noisy speech model creation and storage unit for creating and storing initial noisy speech models from the initial noise model and the clean speech models;

a Jacobian matrix calculation and storage unit for calculating and storing Jacobian matrices of a Taylor expansion expressing a change in a model parameter in terms of a change in the noise data, from the initial noise model and the initial noisy speech models;

a difference calculation unit for calculating a difference between the initial noise model and an adaptation target noise model obtained from the over-estimation and under-estimation error components of the noise data which is obtained from the input noisy speech data inputted under a current condition at a time of actual recognition;

an adapted noisy speech model calculation and storage unit for calculating and storing adapted noisy speech models from the difference, the initial noisy speech models, and the Jacobian matrices;

a noisy speech spectral subtraction unit for obtaining a noise subtracted speech data by calculating an average spectrum from a partial or entire section of the noise data which is obtained from the input noisy speech data inputted under a current condition at a time of actual recognition, and subtracting the average spectrum from a spectrum of an entire section of the input noisy speech data inputted under a current condition at a time of actual recognition; and a speech recognition unit for carrying out a speech recognition by calculating a likelihood of each adapted noisy speech model expressing features of each recognition category with respect to the noise subtracted speech data and outputting a recognition category expressed by an adapted noisy speech model with a highest likelihood among the adapted noisy speech models as a recognition result.

3. A pattern recognition method, comprising the steps of:

inputting input vectors;

extracting a parameter expressing a condition of pattern recognition and probabilistic model training from each input vector;

creating and storing an initial condition probabilistic model from the parameter expressing the condition extracted from the input vector inputted under an initial condition at a time of acquiring training data;

storing prescribed reference probabilistic models corresponding to a prescribed value of the parameter expressing the condition;

creating and storing initial condition imposed probabilistic models from the initial condition probabilistic model and the reference probabilistic models;

calculating and storing Jacobian matrices of a Taylor expansion expressing a change in a model parameter in terms of a change in the parameter expressing the condition, from the initial condition probabilistic model and the initial condition imposed probabilistic models;

calculating a difference between the initial condition probabilistic model and an adaptation target condition probabilistic model obtained from the parameter expressing the condition which is extracted from the input vector inputted under a current condition at a time of actual recognition;

calculating and storing adapted condition imposed probabilistic models from the difference, the initial condition imposed probabilistic models, and the Jacobian matrices; and carrying out a pattern recognition by calculating a likelihood of each adapted condition imposed probabilistic model expressing features of each recognition category with respect to the input vector and outputting a recognition category expressed by an adapted condition imposed probabilistic model with a highest likelihood among the adapted condition imposed probabilistic models as a recognition result.

4. A speech recognition method, comprising the steps of:

inputting input noisy speech data;

extracting a noise data from each input noisy speech data;

obtaining over-estimation and under-estimation error components of the noise data by calculating an average spectrum from a partial or entire section of the noise data and subtracting the average spectrum from a spectrum of an entire section of the noise data;

creating and storing an initial noise model from the over-estimation and under-estimation error components of the noise data which is obtained from the input noisy speech data inputted under an initial condition at a time of acquiring training data;

storing prescribed clean speech models;

creating and storing initial noisy speech models from the initial noise model and the clean speech models;

calculating and storing Jacobian matrices of a Taylor expansion expressing a change in a model parameter in terms of a change in the noise data, from the initial noise model and the initial noisy speech models;

calculating a difference between the initial noise model and an adaptation target noise model obtained from the over-estimation and under-estimation error components of the noise data which is obtained from the input noisy speech data inputted under a current condition at a time of actual recognition;

calculating and storing adapted noisy speech models from the difference, the initial noisy speech models, and the Jacobian matrices;

obtaining a noise subtracted speech data by calculating an average spectrum from a partial or entire section of the noise data which is obtained from the input noisy speech data inputted under a current condition at a time of actual recognition, and subtracting the average spectrum from a spectrum of an entire section of the input noisy speech data inputted under a current condition at a time of actual recognition; and carrying out a speech recognition by calculating a likelihood of each adapted noisy speech model expressing features of each recognition category with respect to the noise subtracted speech data and outputting a recognition category expressed by an adapted noisy speech model with a highest likelihood among the adapted noisy speech models as a recognition result.

5. A method of model adaptation in a pattern recognition in which a likelihood of an input vector with respect to each probabilistic model expressing features of each recognition category is calculated and a recognition category expressed by a probabilistic model with a highest likelihood among a plurality of prescribed probabilistic models is outputted as a recognition result, the method comprising the steps of:

(a) training an initial condition probabilistic model from a parameter expressing a condition of pattern recognition and probabilistic model training which is recorded at a time of model training;

(b) obtaining an initial condition imposed probabilistic models from the initial condition probabilistic model and prescribed reference probabilistic models corresponding to a prescribed value of the parameter expressing the condition;

(c) calculating and storing Jacobian matrices of a Taylor expansion expressing a change in a model parameter in terms of a change in the parameter expressing the condition, from the initial condition probabilistic model and the initial condition imposed probabilistic models;

(d) training an adaptation target condition probabilistic model by using the parameter expressing the condition which is observed at a time of actual recognition; and (e) obtaining an adapted condition imposed probabilistic models by updating the initial condition imposed probabilistic models according to the Taylor expansion using the Jacobian matrices, when the initial condition probabilistic model and the adaptation target condition probabilistic model are mismatching.

6. The method of claim 5, wherein a preliminary processing formed by the steps (a), (b) and (c) is carried out in advance, prior to an adaptation processing formed by the steps (d) and (e) which is carried out at a time of actual recognition.

7. A computer based apparatus for model adaptation in a pattern recognition in which a likelihood of an input vector with respect to each probabilistic model expressing features of each recognition category is calculated and a recognition category expressed by a probabilistic model with a highest likelihood among a plurality of prescribed probabilistic models is outputted as a recognition result, the apparatus comprising:

(a) a unit for training an initial condition probabilistic model from a parameter expressing a condition of pattern recognition and probabilistic model training which is recorded at a time of model training;

(b) a unit for obtaining an initial condition imposed probabilistic models from the initial condition probabilistic model and prescribed reference probabilistic models corresponding to a prescribed value of the parameter expressing the condition;

(c) a unit for calculating and storing Jacobian matrices of a Taylor expansion expressing a change in a model parameter in terms of a change in the parameter expressing the condition, from the initial condition probabilistic model and the initial condition imposed probabilistic models;

(d) a unit for training an adaptation target condition probabilistic model by using the parameter expressing the condition which is observed at a time of actual recognition; and (e) a unit for obtaining an adapted condition imposed probabilistic models by updating the initial condition imposed probabilistic models according to the Taylor expansion using the Jacobian matrices, when the initial condition probabilistic model and the adaptation target condition probabilistic model are mismatching.

8. The apparatus of claim 7, wherein the units (a), (b) and (c) carry out a preliminary processing realized by the units (a), (b) and (c) in advance, prior to an adaptation processing realized by the units (d) and (e) which is carried out at a time of actual recognition.

9. An article of manufacture, comprising:
a computer usable medium having computer readable program code means embodied therein for causing a computer to function as a model adaptation system in a pattern recognition in which a likelihood of an input vector with respect to each probabilistic model expressing features of each recognition category is calculated and a recognition category expressed by a probabilistic model with a highest likelihood among a plurality of prescribed probabilistic models is outputted as a recognition result, the computer readable program code means including:
first a computer readable program code means for causing said computer to train an initial condition probabilistic model from a parameter expressing a condition of pattern recognition and probabilistic model training which is recorded at a time of model training;
second computer readable program code means for causing said computer to obtain an initial condition imposed probabilistic models from the initial condition probabilistic model and prescribed reference probabilistic models corresponding to a prescribed value of the parameter expressing the condition;
third computer readable program code means for causing said computer to calculate and store Jacobian matrices of a Taylor expansion expressing a change in a model parameter in terms of a change in the parameter expressing the condition, from the initial condition probabilistic model and the initial condition imposed probabilistic models;
fourth computer readable program code means for causing said computer to train an adaptation target condition probabilistic model by using the parameter expressing the condition which is observed at a time of actual recognition; and
fifth computer readable program code means for causing said computer to obtain an adapted condition imposed probabilistic models by updating the initial condition imposed probabilistic models according to the Taylor expansion using the Jacobian matrices, when the initial condition probabilistic model and the adaptation target condition probabilistic model are mismatching.

10. The article of manufacture of claim 9, wherein a preliminary processing realized by the first, second and third computer readable program code means is carried out in advance, prior to an adaptation processing realized by the fourth and fifth computer readable program code means which is carried out at a time of actual recognition.

11. A method of model adaptation in a pattern recognition in which a likelihood of an input vector with respect to each probabilistic model expressing features of each recognition category is calculated and a recognition category expressed by a probabilistic model with a highest likelihood among a plurality of prescribed probabilistic models is outputted as a recognition result, the method comprising the steps of:
determining a change in a parameter expressing a condition of pattern recognition and probabilistic model training, between an initial condition at a time of acquiring training data used in obtaining a model parameter of each probabilistic model and a current condition at a time of actual recognition;
adapting the probabilistic models by obtaining a model parameter after a condition change by updating a model parameter before a condition change according to the change determined by the determining step, using a Taylor expansion expressing a change in the model parameter in terms of a change in the parameter expressing the condition, when the initial condition and the current condition are mismatching; and
calculating and storing Jacobian matrices of the Taylor expansion in advance, so that the adapting step obtains the model parameter after a condition change by using the Jacobian matrices as calculated and stored in advance.

12. A method of model adaptation in a pattern recognition in which a likelihood of an input vector with respect to each probabilistic model expressing features of each recognition category is calculated and a recognition category expressed by a probabilistic model with a highest likelihood among a plurality of prescribed probabilistic models is outputted as a recognition result, the method comprising the steps of:
determining a change in a parameter expressing a condition of pattern recognition and probabilistic model training, between an initial condition at a time of acquiring training data used in obtaining a model parameter of each probabilistic model and a current condition at a time of actual recognition;
adapting the probabilistic models by obtaining a model parameter after a condition change by updating a model parameter before a condition change according to the change determined by the determining step, using a Taylor expansion expressing a change in the model parameter in terms of a change in the parameter expressing the condition, when the initial condition and the current condition are mismatching;
storing more than one sets of probabilistic models in correspondence to various types of the condition, such that when the current condition changes in time, the adapting step selects one set of probabilistic model corresponding to a type of the condition that resembles the current condition most from said more than one sets of probabilistic models, and adapts the probabilistic models to the current condition by using the Taylor expansion while setting said one set of probabilistic models as initial probabilistic models; and
calculating and storing more than one sets of Jacobian matrices of the Taylor expansion in correspondence to said more than one sets of probabilistic models in advance, so that the adapting step obtains the model parameter after a condition change by using one set of Jacobian matrices as calculated and stored in advance which corresponds to said one set of probabilistic models.

13. A computer based apparatus for model adaptation in a pattern recognition in which a likelihood of an input vector with respect to each probabilistic model expressing features of each recognition category is calculated and a recognition category expressed by a probabilistic model with a highest likelihood among a plurality of prescribed probabilistic models is outputted as a recognition result, the apparatus comprising:
a change determination unit for determining a change in a parameter expressing a condition of pattern recognition and probabilistic model training, between an initial condition at a time of acquiring training data used in obtaining a model parameter of each probabilistic model and a current condition at a time of actual recognition;

an adaptation unit for adapting the probabilistic models by obtaining a model parameter after a condition change by updating a model parameter before a condition change according to the change determined by the change determination unit, using a Taylor expansion expressing a change in the model parameter in terms of a change in the parameter expressing the condition, when the initial condition and the current condition are mismatching; and a Jacobian matrix calculation and storage unit for calculating and storing Jacobian matrices of the Taylor expansion in advance, so that the adaptation unit obtains the model parameter after a condition change by using the Jacobian matrices as calculated and stored in advance.

14. A computer based apparatus for model adaptation in a pattern recognition in which a likelihood of an input vector with respect to each probabilistic model expressing features of each recognition category is calculated and a recognition category expressed by a probabilistic model with a highest likelihood among a plurality of prescribed probabilistic models is outputted as a recognition result, the apparatus comprising:

a change determination unit for determining a change in a parameter expressing a condition of pattern recognition and probabilistic model training, between an initial condition at a time of acquiring training data used in obtaining a model parameter of each probabilistic model and a current condition at a time of actual recognition;

an adaptation unit for adapting the probabilistic models by obtaining a model parameter after a condition change by updating a model parameter before a condition change according to the change determined by the change determination unit, using a Taylor expansion expressing a change in the model parameter in terms of a change in the parameter expressing the condition, when the initial condition and the current condition are mismatching;

a probabilistic model storage unit for storing more than one sets of probabilistic models in correspondence to various types of the condition, such that when the current condition changes in time, the adaptation unit selects one set of probabilistic model corresponding to a type of the condition that resembles the current condition most from said more than one sets of probabilistic models, and adapts the probabilistic models to the current condition by using the Taylor expansion while setting said one set of probabilistic models as initial probabilistic models; and a Jacobian matrix calculation and storage unit for calculating and storing more than one sets of Jacobian matrices of the Taylor expansion in correspondence to said more than one sets of probabilistic models in advance, so that the adaptation unit obtains the model parameter after a condition change by using one set of Jacobian matrices as calculated and stored in advance which corresponds to said one set of probabilistic models.

15. A computer usable medium having computer readable program code means embodied therein for causing a computer to function as a model adaptation system in a pattern recognition in which a likelihood of an input vector with respect to each probabilistic model expressing features of each recognition category is calculated and a recognition category expressed by a probabilistic model with a highest likelihood among a plurality of prescribed probabilistic models is outputted as a recognition result, the computer readable program code means including:

first computer readable program code means for causing said computer to determine a change in a parameter expressing a condition of pattern recognition and probabilistic model training, between an initial condition at a time of acquiring training data used in obtaining a model parameter of each probabilistic model and a current condition at a time of actual recognition;

second computer readable program code means for causing said computer to adapt the probabilistic models by obtaining a model parameter after a condition change by updating a model parameter before a condition change according to the change determined by the first computer readable program code means, using a Taylor expansion expressing a change in the model parameter in terms of a change in the parameter expressing the condition, when the initial condition and the current condition are mismatching; and third computer readable program code means for causing said computer to calculate and store Jacobian matrices of the Taylor expansion in advance, so that the second computer readable program code means obtains the model parameter after a condition change by using the Jacobian matrices as calculated and stored in advance.

16. A computer usable medium having computer readable program code means embodied therein for causing a computer to function as a model adaptation system in a pattern recognition in which a likelihood of an input vector with respect to each probabilistic model expressing features of each recognition category is calculated and a recognition category expressed by a probabilistic model with a highest likelihood among a plurality of prescribed probabilistic models is outputted as a recognition result, the computer readable program code means including:

first computer readable program code means for causing said computer to determine a change in a parameter expressing a condition of pattern recognition and probabilistic model training, between an initial condition at a time of acquiring training data used in obtaining a model parameter of each probabilistic model and a current condition at a time of actual recognition;

second computer readable program code means for causing said computer to adapt the probabilistic models by obtaining a model parameter after a condition change by updating a model parameter before a condition change according to the change determined by the first computer readable program code means, using a Taylor expansion expressing a change in the model parameter in terms of a change in the parameter expressing the condition, when the initial condition and the current condition are mismatching;

third computer readable program code means for causing said computer to store more than one sets of probabilistic models in correspondence to various types of the condition, such that when the current condition continuously changes in time, the second computer readable program code means selects one set of probabilistic model corresponding to a type of the condition that resembles the current condition most from said more than one sets of probabilistic models, and adapts the probabilistic models to the current condition by using the Taylor expansion while setting said one set of probabilistic models as initial probabilistic models; and fourth computer readable program code means for causing said computer to calculate and store more than one sets of Jacobian matrices of the Taylor expansion in correspondence to said more than one sets of probabilistic models in advance, so that the second computer readable program code means obtains the model parameter after a condition change by using one set of Jacobian matrix as calculated and stored in advance which corresponds to said one set of probabilistic models.

* * * * *